US010159012B2

(12) United States Patent
Haberland et al.

(10) Patent No.: US 10,159,012 B2
(45) Date of Patent: Dec. 18, 2018

(54) BASEBAND SIGNAL PROCESSING CLUSTER

(71) Applicant: ALCATEL LUCENT, Paris (FR)

(72) Inventors: Bernd Haberland, Fellbach (DE); Fariborz Derakhshan, Nuremberg (DE); Heidrun Grob-Lipski, Starzach (DE)

(73) Assignee: Alcatel Lucent, Paris (FR)

( * ) Notice: Subject to any disclaimer, the term of this patent is extended or adjusted under 35 U.S.C. 154(b) by 214 days.

(21) Appl. No.: 14/357,942

(22) PCT Filed: Sep. 25, 2012

(86) PCT No.: PCT/EP2012/068859
§ 371 (c)(1),
(2) Date: May 13, 2014

(87) PCT Pub. No.: WO2013/072108
PCT Pub. Date: May 23, 2013

(65) Prior Publication Data
US 2014/0328178 A1 Nov. 6, 2014

(30) Foreign Application Priority Data

Nov. 14, 2011 (EP) .................................... 11306485
May 22, 2012 (EP) .................................... 12305557

(51) Int. Cl.
*H04W 28/08* (2009.01)
*H04W 88/08* (2009.01)
*H04W 52/02* (2009.01)

(52) U.S. Cl.
CPC .......... *H04W 28/08* (2013.01); *H04W 88/08* (2013.01); *H04W 52/0206* (2013.01); *H04W 88/085* (2013.01)

(58) Field of Classification Search
CPC ............. H04W 28/08; H04W 52/0206; H04W 88/085; H04W 88/08
See application file for complete search history.

(56) References Cited

U.S. PATENT DOCUMENTS 8,009,575 B1 * 8/2011 Spain .................. H04L 41/0896
370/252
8,155,072 B2 * 4/2012 Warrillow ........... H04L 12/5695
370/330

(Continued)

FOREIGN PATENT DOCUMENTS

CN 101193084 A 6/2008
CN 101505500 A 8/2009

(Continued)

OTHER PUBLICATIONS

English Bibliography for Japanese Patent Application Publication No. JP2001285172A, published Oct. 12, 2001, printed from Thomson Innovation on Jun. 28, 2015, 4 pp.

(Continued)

Primary Examiner — Walter Divito
Assistant Examiner — Anthony Luo
(74) Attorney, Agent, or Firm — Fay Sharpe LLP

(57) ABSTRACT

Embodiments relate to a baseband signal processing cluster of a wireless communication network, the baseband signal processing cluster comprising baseband signal processing units, wherein at least one of the baseband signal processing units is coupled to at least one remote radio head of the wireless communication network and comprises a unit-specific processing resource management entity operable to manage a processing resource allocation within its associated baseband signal processing unit, an intra-cluster processing resource management entity coupled to at least one of the unit-specific processing resource management entities and operable to manage a processing resource allocation (Continued)

among the baseband signal processing units, and an inter-cluster processing resource management entity coupled to the intra-cluster processing resource management entity and operable to exchange information with at least one remote inter-cluster processing resource management entity of a remote baseband signal processing cluster of the wireless communication network to effect a remote processing resource allocation.

20 Claims, 6 Drawing Sheets

(56) References Cited

U.S. PATENT DOCUMENTS

| | | | |
|---|---|---|---|
| 8,185,776 B1* | 5/2012 | Gentes | G06F 11/1438 709/223 |
| 2005/0273601 A1* | 12/2005 | Buch | G06F 9/50 713/161 |
| 2006/0245361 A1 | 11/2006 | Cheethirala et al. | |
| 2007/0091896 A1 | 4/2007 | Liu | |
| 2007/0177552 A1 | 8/2007 | Wu et al. | |
| 2007/0274216 A1 | 11/2007 | Hashigami | |
| 2008/0045226 A1 | 2/2008 | Liu | |
| 2008/0233966 A1* | 9/2008 | Scheim | H04L 5/0023 455/452.1 |
| 2008/0318589 A1 | 12/2008 | Liu et al. | |
| 2009/0175241 A1* | 7/2009 | Ohta | H04W 36/02 370/331 |
| 2010/0146149 A1 | 6/2010 | Vasseur et al. | |
| 2010/0214997 A1* | 8/2010 | Tao | H04W 16/12 370/329 |
| 2010/0227620 A1* | 9/2010 | Naden | H04B 7/2606 455/445 |
| 2011/0135300 A1* | 6/2011 | Oyane | H04W 56/00 398/25 |
| 2011/0158332 A1* | 6/2011 | Wu | H04W 88/08 375/259 |
| 2012/0202507 A1 | 8/2012 | Zhang et al. | |
| 2014/0293784 A1 | 10/2014 | Haberland | |

FOREIGN PATENT DOCUMENTS

| | | | | |
|---|---|---|---|---|
| CN | 101868054 A | 10/2010 | | |
| CN | 102045892 A | 5/2011 | | |
| EP | 1 713 290 A1 | 10/2006 | | |
| EP | 1954075 A1 | 8/2008 | | |
| EP | 2222130 A1 * | 8/2010 | | H04W 88/085 |
| EP | 2 265 054 A1 | 12/2010 | | |
| EP | 2 512 202 A1 | 10/2012 | | |
| EP | 2669798 A1 | 12/2013 | | |
| JP | 2001285172 A | 10/2001 | | |
| JP | 200719724 A | 1/2007 | | |
| JP | 2007529926 A | 10/2007 | | |
| JP | 2007318561 A | 12/2007 | | |
| JP | 2009201046 A | 9/2009 | | |
| JP | 2009206769 A | 9/2009 | | |
| WO | 2000028754 A | 5/2000 | | |

OTHER PUBLICATIONS

English Bibliography for Japanese Patent Application Publication No. JP200719724A, published Jan. 25, 2007, printed from Thomson Innovation on Jun. 28, 2015, 3 pp.
English Bibliography for Japanese Patent Application Publication No. JP2007318561A, published Dec. 6, 2007, printed from Thomson Innovation on Jun. 28, 2015, 4 pp.
English Bibliography for Japanese Patent Application Publication No. JP2007529926A, published Oct. 25, 2007, printed from Thomson Innovation on Jun. 28, 2015, 4 pp.
English Bibliography for Japanese Patent Application Publication No. JP2009201046A, published Sep. 3, 2009, printed from Thomson Innovation on Jun. 28, 2015, 3 pp.
English Bibliography for Japanese Patent Application Publication No. JP2009206769A, published Sep. 10, 2009, printed from Thomson Innovation on Jun. 28, 2015, 4 pp.
PCT Pat App No. PCT/EP2012/068859, Written Opinion of the International Searching Authority, dated Dec. 10, 2012, 6 pp.
European Pat App No. 11306485, Extended European Search Report, dated Aug. 1, 2012, 8 pp.
PCT Pat App No. PCT/EP2012/069909, International Search Report, dated Oct. 12, 2012, 5 pp.
PCT Pat App No. PCT/EP2012/069909, Written Opinion of the International Searching Authority, dated Oct. 12, 2012, 6 pp.
CMCC et al., "Application of BBU+RRU based CoMP system to LTE-Advanced," 3$^{rd}$ Generation Partnership Project (3GPP), 3GPP TSG-RAN #55, R1-084612, pp. 1-2, XP050317843, Prague, Czech Republic, Nov. 10-14, 2008.
Chttl et al., "Views on heterogeneous deployment scenarios with distributed RRHs," 3$^{rd}$ Generation Partnership Project (3GPP), 3GPP TSG RAN WG1 Meeting #64, R1-111006, pp. 1-3, XP050490799, Taipei, Taiwan, Feb. 21-25, 2011.
International Search Report for PCT/EP2012/068859 dated Dec. 10, 2012.
English Bibliography for Chinese Patent Application Publication No. CN101193084A, published Jun. 4, 2008, printed from Thomson Innovation on Jan. 24, 2017, 4 pp.
English Bibliography for Chinese Patent Application Publication No. CN102045892A, published May 4, 2011, printed from Thomson Innovation on Jan. 24, 2017, 4 pp.
English Bibliography for Chinese Patent Application Publication No. CN101505500A, published Aug. 12, 2009, printed from Thomson Innovation on Jan. 24, 2017, 3 pp.
Zhenbo Zhu et al., "Virtual base station pool: towards a wireless network cloud for radio access networks", Computing Frontiers, ACM 2 Penn Plaza, Suite 701, New York, NY 10121-0701 USA, May 3, 2011 (May 3, 2011), pp. 1-10 XP058006421.
English Bibliography for Chinese Patent Application Publication No. CN101868054A, published Oct. 20, 2010, printed from Thomson Innovation on Feb. 27, 2018, 4 pp.

* cited by examiner

BASEBAND SIGNAL PROCESSING CLUSTER

Embodiments of the present invention generally relate to wireless communications and, more specifically, to distributed load balancing or distribution of baseband resources in a radio access network.

BACKGROUND

Demands for higher data rates for mobile services are steadily increasing. At the same time modern mobile communication systems, such as $3^{rd}$ Generation (3G) systems and $4^{th}$ Generation (4G) systems, provide enhanced technologies which enable higher spectral efficiencies and allow for higher data rates and cell capacities. As the demand for high-rate services with increasing variance grows faster than the cell capacities, operators are urged to increase the number of cells in their networks, i.e. the density of base stations increases. Base station transceivers are major contributors to the overall power consumption of a mobile communication system or network and therewith also major contributors to the OPerational EXpenditures (OPEX) operators are facing. One power saving strategy is to move processing capacity away from the base station transceivers and towards centralized processing units providing processing capabilities for several base station transceivers. The processing equipment of a base station transceiver consumes a significant part of a base station transceiver's total power, although the processing capabilities of a base station transceiver are only fully exploited in high load conditions, which do not occur permanently, but rather during peak hours only. Different cells in radio access systems are very heterogeneous to each other in regard to their traffic load over time. This means in a cluster of cells, the different cells do not have their peak busy hour at the same time.

Currently, the Radio Access of mobile Networks (RAN) uses base stations or base station transceivers, as e.g. eNodeBs for the most recent technology LTE (Long Term Evolution), handling all radio, baseband and control functions.

Much of the entire RAN's CApital EXpenditure (CAPEX) and OPEX is therefore attributed to each site's individual processing units, as for example site rent, infrastructure, processing hardware, maintenance, etc. Several approaches to cut at least a big share of these cost elements have been subject to recent research activities. Some solutions reduce emitted power and processing complexity and therewith reduce required volume, however, these solutions are at the expense of increasing the number of required sites.

SUMMARY

It is one finding of the present invention that the cost efficiency of a radio access network can be improved by moving processing capabilities away from the radio front ends and by using cloud computing or load balanced processing units as processing capability. Such processing capability can be allocated to a number of radio front-ends, whereby the overall processing capability can be utilized more efficiently. Embodiments may therefore provide a concept with a reduced overall processing capacity therewith reducing the overall power consumption, the OPEX and CAPEX of a mobile communication system.

Cloud computing may lower operating cost by a shared use of large installed resources as pools. In addition, installation costs may reduce by scaling effects of hardware and lower requirements (per user) for costly peripheral equipment and hardware. With a sophisticated load sharing of installed processing resources taking into account different load profiles over time for indoor (either enterprise or residential) or outdoor applications, a significant reduction of sites and required hardware can be achieved. This leads to OPEX and CAPEX reductions for the operators. In addition to the load balancing/distribution of processing resources, embodiments of the present invention may also enable allocating processing resources from low traffic areas to high traffic areas in a general context of load management.

It is a further finding that a multi-standard configuration can be modified in a semi-static way by software (SW) replacement, even if individual processing elements are only capable of operating one radio standard or Radio Access Technology (RAT) at a given time. This provides the operator more flexibility of evolving a multi-standard system without the need to change any hardware (HW).

Hence, embodiments of the present invention aim at renewing current RAN architectures for next generation mobile Radio Access Networks (RANs) by providing a decentralized load balancing/distribution approach that integrates cloud computing elements.

In embodiments, the RAN architecture may be composed of a Remote Radio Head (RRH), which may be regarded as a radio front-end, i.e., which receives and transmits the actual radio signals and establishes at least one radio cell. In the following, two directions of transmission will be considered. The first one is referred to as downlink or forward link. It refers to a transmission from the RAN, i.e. the RRH, to a mobile terminal or User Equipment (UE) in the coverage area. The second one is referred to as uplink or reverse link. It refers to a transmission from a mobile terminal to the RAN, i.e. the RRH. In the uplink a RRH may convert received radio signals from a transmission-band to baseband receive signals and provide the baseband receive signals to a distributed load balancing/distribution architecture of a cloud computing network. In the downlink the RRH may convert a baseband transmit signal, which has been processed in the cloud network, to the transmission-band and transmit the signal using one or multiple antennas.

In the following, it will be referred to the transmission-band as a system frequency band with a system bandwidth and a carrier frequency. The transmission-band may comprise a sub-band for downlink transmission and a sub-band for uplink reception of radio signals, as e.g. in a Frequency Division Duplex (FDD) system. In some embodiments the same transmission-band may be used for downlink and uplink, as in a Time Division Duplex (TDD) system.

In conventional solutions, there is a 1:1 relationship between a baseband processing unit and a RRH, where the baseband processing capacity is dimensioned according to peak traffic. In some embodiments the RRHs may provide transmission (Tx), reception (Rx) and antenna functions. A RRH may be spatially separated from an associated baseband processing unit or Base-Band Unit (BBU) as a pool of conventional baseband processing elements so that the latter can be combined within an inter-BBU cloud computing cluster of several BBUs. This opens the path to apply technologies of cloud computing (intra-BBU and inter-BBU), establish distributed or decentralized load balancing/distribution and directly reduce the number of required processing sites and in parallel the associated installation cost, but also maintenance and power consumption.

In other words, embodiments may provide RAN architecture with RRHs and baseband (signal) processing units forming nodes of a cloud computing architecture. Thereby each individual network node, i.e. BBU, is equipped with a processing resource allocation entity, such that the individual interconnected load balancing/distribution entities of the network nodes together form a distributed or decentralized load balancer, which will also be referred to as Decentralized Cloud Controller (DCC) in the following. Thereby, a DCC may, in cooperation with other DCCs of the cloud computing network, distribute or route the load received by its associated BBU from the RRHs to other nodes or BBUs of the network. This increases the flexibility of the traffic distribution for an operator.

According to a first aspect of the present invention it is provided a baseband signal processing cluster of a wireless communication network. The baseband signal processing cluster comprises a plurality of baseband signal processing units, wherein at least one (in particular each) of the baseband signal processing units is coupled to at least one Remote Radio Head (RRH) of the wireless communication network. Thereby a RRH may serve at least one radio cell of the wireless communication network. Hence, the baseband signal processing cluster is associated to a first radio cell cluster of the wireless communication network. Also, at least one (in particular each) of the baseband signal processing units is coupled to or comprises a unit-specific (signal) processing resource management entity which is operable to manage a (baseband) signal processing resource allocation within or of its associated baseband signal processing unit. A baseband signal processing unit of the baseband signal processing cluster may also be referred to as BaseBand Unit (BBU) in the sequel. Thereby, such a baseband signal processing unit may serve for processing baseband signals of one or more users of the wireless communication network. The baseband signal processing cluster comprises an intra-cluster (signal) processing resource management entity which is coupled to the at least one (in particular each) unit-specific processing resource management entity and which is operable to manage or balance/distribute a signal processing resource allocation among the plurality of baseband signal processing units of the cluster. Coupled to the intra-cluster processing resource management entity is an inter-cluster (signal) processing resource management entity which is operable to exchange information, possibly indicative of a (signal) processing load of the signal processing cluster, with at least one remote inter-cluster processing resource management entity of at least one remote baseband signal processing cluster associated to a second (different) radio cell cluster of the wireless communication network in order to effect or manage a remote processing allocation. That is to say, if available processing resources of the baseband signal processing cluster are not sufficient for handling certain user- or bearer specific baseband signal processing requests related to users of the cluster, remote baseband signal processing resources of a remote cluster may be allocated additionally or alternatively.

Embodiments of the present invention may be in principle employed in various present and future wireless communication systems, such as, for example, wireless communication systems standardized by the 3$^{rd}$ Generation Partnership Project (3GPP), such as the Global System for Mobile Communications (GSM), Enhanced Data rates for GSM Evolution (EDGE), GSM/EDGE Radio Access Network (GERAN), Universal Terrestrial Radio Access Network (UTRAN) or Evolved UTRAN (E-UTRAN), Long Term Evolution (LTE) or LTE-Advanced (LTE-A), or wireless communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. In the following the terms wireless communication system and mobile communication network may be used synonymously. Note that the concept of the present invention is not limited to the aforementioned wireless communication systems but is also applicable to other as well as future wireless communication system standards.

Accordingly, the at least one RRH may, for example, comprise a radio transceiver for a GSM, an EDGE, a UMTS, an LTE or an LTE-A cellular communication system. Of course, the RRH may also serve at least one cell of a future wireless communication system. The at least one RRH may be coupled to the baseband processing unit for exchanging complex value digital baseband data between the baseband processing unit and the at least one RRH. For that purpose, an interface known as common public radio interface (CPRI) may be used, for example.

A baseband signal processing unit or BBU may be understood as a processing node of the baseband (signal) processing cluster. Both the individual baseband processing units (BBUs) and the baseband processing cluster may be part of a cloud computing network comprising a plurality of such baseband processing clusters. For exchanging data among BBUs within a baseband processing- or BBU-cluster the BBUs may comprise an interface to connect a first BBU to a second BBU serving as a second signal processing node of the BBU cluster. Said interface can be adapted for exchanging digital baseband data between the signal processing units (BBUs). Such data exchange between the individual BBUs of a BBU cluster may be managed by the intra-cluster processing resource management entity, which may hence also be regarded as an intra-cluster load balancing/distribution entity. The interface may further serve for exchanging control information between the interconnected BBUs, such as an extended X2-interface as part of the 3GPP specifications for LTE, for example.

Cloud computing or a cloud computing network may be understood as a technology that may provide computation, software, data access, and storage services that do not require end-user knowledge of a physical location and configuration of the system or network that delivers the services. Hence, cloud computing describes a supplement, consumption, and delivery model for IT services, for example based on Internet Protocols (IP), and typically involves provisioning of dynamically scalable and often virtualized resources. Hence, in a BBU cloud computing network there is a pool of clusters of BBU hardware or baseband processing units. Each BBU may be regarded as a network node of the cloud computing network, wherein each node accommodates one or more of such computing or signal processing resources. According to embodiments, a baseband signal processing task is not necessarily tied to a particular network node but may dynamically be allocated to an arbitrary other network node of the same BBU cluster or even to a network node of another, remote BBU cluster, using the distributed load management and a distribution approach of embodiments of the present invention. Hence, an efficient use of available distributed hardware resources may be achieved. All this can be done if latency requirements of the wireless communication system are complied with.

Each BBU may comprise a plurality of dedicated user data processors, wherein each of the dedicated user data processors is operable to process all user-specific data from S1 termination up to the user part of the physical layer being associated to the radio cell served by the at least one RRH which is coupled to the respective BBU. Signal processing tasks among the dedicated user data processors of a BBU as physical layer of a cell may be managed by the unit-specific signal processing resource management entity.

In embodiments the user-specific data may also be understood as bearer-specific data. That is to say, the user-specific data or data streams may refer to different radio bearers, a radio bearer being a protocol context for a data service of a user. In other words, a user may utilize multiple services, which are provided using different radio bearers. For further details refer to the 3GPP specifications, e.g., radio interface protocol architecture 3GPP TS 25.301 V10.0.0. In UMTS or LTE the physical layer (Layer 1 or PHY), the Medium Access Control layer (Layer 2 or MAC), the RLC-layer and the RRC may be involved. All of these protocols have been standardized by the 3GPP and their respective specifications are published and are considered as known in the sequel of this specification.

The signal processing of the user-specific data (packets or streams) of the users associated to the BBUs of the processing cluster leads to a certain signal processing load of the cluster. The BBU cluster comprises the inter-cluster processing resource management entity which is operable to exchange load information with a remote inter-cluster processing resource management entity of at least a second, remote BBU cluster via an inter-cluster interface and to thus distribute processing tasks between the plurality of BBUs of the first cluster and the remote, second cluster, in response to the exchanged load information. The distribution of the processing tasks among BBUs of different BBU clusters in the cloud computing network may be done according to a load-balancing or load-distribution criterion. Such a load-balancing/distribution criterion may for example be an equally shared distribution of the load among the individual BBU clusters and/or BBUs. Another criterion may be to optimize the power consumption of the BBU clusters and/or BBUs. For example, some BBUs or parts thereof may be switched off for as long as other active BBUs can handle the load.

Hence, embodiments may provide a baseband or bearer signal processing scheme in a distributed or cloud-like manner, as the baseband or bearer signal processing can be carried out by a plurality of different interconnected BBUs as processing nodes, which can be arranged in spatially separated BBU clusters, for example. This may provide the advantage that more processing power can be made available through utilization of a distributed network of BBU clusters and/or BBUs, when there is a traffic hot zone at a certain BBU cluster.

Moreover, embodiments may provide the advantage that scalable processing power can be made available per radio cell, since the services of a radio cell can be de-multiplexed into service or user-specific data packets, which can then in turn be routed to different processing nodes of the cloud. In other words, the processing of user- or bearer-specific data may be distributed among the various network nodes according to a given load balancing/distribution criterion. That means that there is no fixed association for the user processing between a given RRH and a BBU to which the RRH is physically connected, since user- or bearer-specific signals processed by the RRH may not necessarily be pre- or post-processed by the physically connected BBU. Due to the distributed load balancing and/or load distribution architecture of embodiments, the BBU cloud network decides on which signal processing node to perform the baseband or bearer processing for a given user based on the load balancing/distribution criterion.

In certain load situations the intra-cluster processing resource management entity may decide to shift a baseband or bearer processing of user-specific data from a first BBU of the cluster to another, second, BBU of the same signal processing cluster in order to improve the load balancing/distribution situation among BBUs within the cluster. Hence, a second BBU of the signal processing cluster may process user-specific data from a user who is actually associated to a RRH or cell coupled to the first BBU.

In case only limited available signal processing capabilities of the BBUs of a BBU cluster do not allow the allocation of a BBU of the BBU cluster for processing user- or bearer-specific data, the inter-cluster processing resource management entity may communicate with one or more remote BBU clusters in order to allocate a remote BBU cluster which has sufficient signal processing capabilities available for taking over the requested user- or bearer-specific signal processing task from the first BBU cluster. Hence, a BBU of the remote second cluster may then process user-specific data of a user who is actually associated to a BBU of the first cluster. This hierarchical structure of BBUs, intra-cluster processing resource management entity, and inter-cluster processing resource management entity enables a distributed load balancing/distribution with only little inter-communication between different clusters.

According to some embodiments, the plurality of BBUs of the BBU cluster may comprise a first group of BBUs which is operable to process user-specific data according to a first Radio Access Technology (RAT), for example CDMA for UMTS. Further, the plurality of BBU of the BBU cluster may also comprise a second group of BBUs which is operable to process user-specific data according to a second RAT, for example OFDMA for LTE. The different groups of BBUs may be implemented on one or more different Printed Circuit Boards (PCBs), which may also be referred to as channel element modules (CEM), possibly together with respective cell physical layer processors supporting the same RAT. That is to say, a first cell physical layer processor supporting the first RAT and the first group of signal processing units may be integrated onto a first common CEM, and a second cell physical layer processor supporting the second RAT and the second group of signal processing units may be integrated onto a second common CEM of the same BBU. Hence, the BBU cluster may also be referred to as MultiSite MultiStandard (MSS) BBU cluster.

According to a further aspect of the present invention, it is provided a cloud computing network comprising at least two baseband signal processing clusters, according to embodiments, as different network node clusters of the cloud computing network. Therewith, a decentralized load balancing/distribution becomes possible as the decentralized load balancers, comprising the intra-cluster processing resource management entity and the inter-cluster processing resource management entity, respectively, of the first and the second cluster are operable to exchange load information via the interface between the first and the second cluster and to distribute baseband signal processing tasks between the plurality of BBUs of the first cluster and the second cluster in response to the exchanged load information, in order to distribute signal processing load among different BBU clusters of the cloud computing network.

According to yet a further aspect of the present invention, it is provided a method for a baseband signal processing cluster (BBU cluster) of a wireless communication network, the baseband signal processing cluster comprising a plurality of baseband signal processing units (BBUs), wherein at least one (in particular each) of the baseband signal processing units is coupled to at least one RRH serving a first radio cell cluster of the wireless communication network. The method comprises a step of providing information on an available (signal) processing capability of the plurality of BBUs of the BBU cluster. In response to a user- or bearer specific signal processing request for a user associated to a remote radio head coupled to a BBU of the cluster, the method comprises the step of allocating processing resources among the plurality of BBUs of the BBU cluster, if the information on the available signal processing capability within the BBU cluster indicates sufficient available processing resources for the user- or bearer specific signal processing request. If, however, the available signal processing capability within the BBU cluster indicates not sufficient available signal processing resources for the user- or bearer specific signal processing request, the method comprises the step of sending a remote processing resource request to at least one remote BBU cluster associated to a different second radio cell cluster via the inter-cluster processing resource management entity of the cluster.

Some embodiments comprise one or more programmable digital control circuits installed within the apparatus or the signal processing cluster for performing the method. Such a programmable digital control circuit, for example a digital signal processor (DSP), a Field Programmable Gate Array (FPGA), or a general purpose processor with hardware accelerators, needs to be programmed accordingly. Hence, yet further embodiments also provide a computer program having a program code for performing embodiments of the method, when the computer program is executed on a programmable hardware device.

One benefit of embodiments is that a number of base station sites and/or the base station processing capacity may be reduced due to the distributed load balancing/distribution, which in turn may lead to OPEX/CAPEX reduction. Furthermore, a semi-static multi-RAT radio access network may be provided by CEM software replacement. This allows following the evolution of radio standards without cumbersome hardware modifications.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements through-out the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
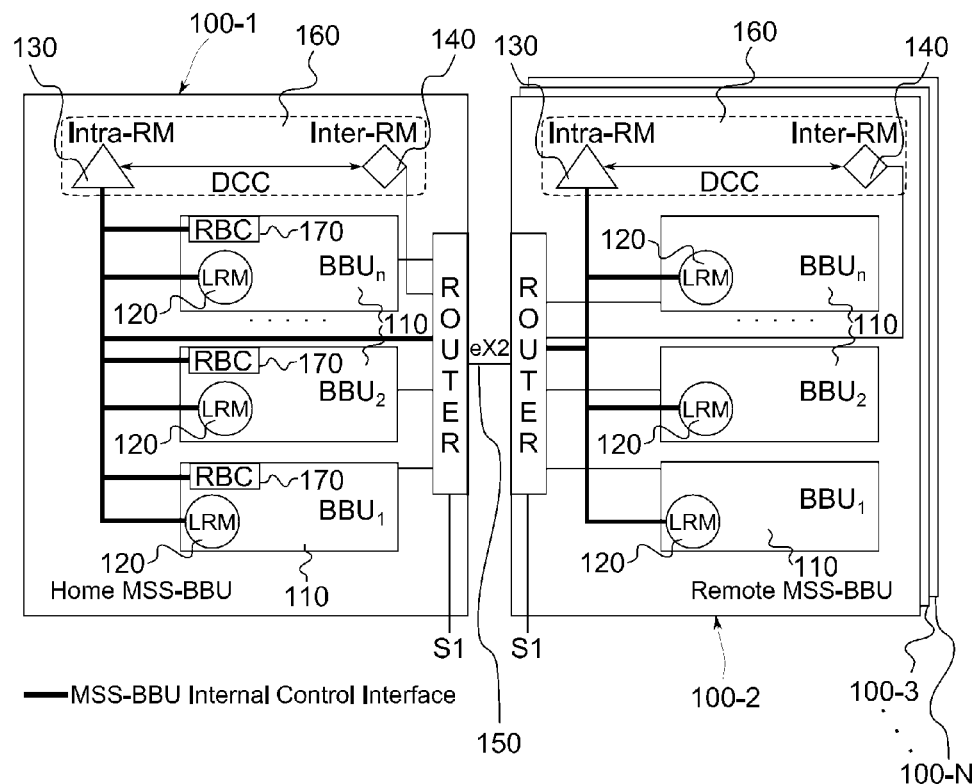
FIG. 1 shows a plurality of interconnected baseband processing clusters of a wireless communication network according to an embodiment of the present invention.

FIG. 1 schematically illustrates cloud network comprising a plurality of interconnected baseband signal processing clusters (MSS-BBU clusters) 100-1, 100-2, . . . , 100-N, wherein N denotes a positive integer equal to or larger than 2. The plurality of baseband processing clusters 100-1 to 100-N serves for processing up- and/or downlink data of a wireless communication network, such as a UMTS network, a LTE- or LTE-A network, or any other present or future wireless communication network. Each of the signal processing clusters 100-1 to 100-N comprises a plurality of baseband signal processing units (BBUs) 110, wherein each of the BBUs 110 may be coupled to at least one RRH (not shown in FIG. 1) of the wireless communication network. Further, each of the BBUs 110 may comprise or may be coupled to a unit-specific processing resource management entity 120 which is operable to manage a signal processing resource allocation of an associated BBU 110. The unit-specific processing resource management entity 120 may also be referred to as Local Resource Manager (LRM) of each BBU 110. Further, each of the MSS-BBU clusters 100-1 to 100-N may comprise an intra-cluster processing resource management entity 130 which may be coupled to each of the BBUs 110 and/or to each of the unit-specific processing resource management entities 120 thereof. The intra-cluster (signal) processing resource management entity 130 may also be referred to as intra-cluster Resource Manager (intra-RM). The intra-RM 130 is operable to manage a processing resource allocation for user- or bearer-specific data processing among the plurality of BBUs 110 within a MSS-BBU cluster 100-1, 100-2, ... , 100-N. Each of the MSS-BBU clusters 100-1 to 100-N also comprises an inter-cluster processing resource management entity 140 which may be coupled to the intra-RM 130 and which is operable to exchange information, possibly indicative of a (signal) processing capability or load available in its associated MSS-BBU cluster, with at least one further, remote inter-cluster processing resource management entity 140 of a remote MSS-BBU cluster of the wireless communication network for managing a remote baseband signal processing resource allocation. The inter-cluster processing resource management entity 140 may also be referred to as inter-MSS-BBU Resource Manager (inter-RM). The inter-RMs 140 of different MSS-BBU clusters 100-1 to 100-N may communicate with each other via an inter-cluster signal interface 150. The inter-cluster signal interface 150 may, for example, be an enhanced X2 (eX2) interface on Ethernet. Both the intra-RM 130 and the inter-RM 140 form a so-called Decentralized Cloud Controller (DCC) 160 available in each MSS-BBU cluster 100-1 to 100-N.

In the sequel, MSS-BBU cluster 100-1 may, for didactic reasons, be regarded as a home MSS-BBU cluster for a cluster of associated radio cells. The home MSS-BBU cluster 100-1 of a user may be regarded as a logical function per user and includes the home BBU 110 with its control end cell functions connected to the RRH serving the radio cell where the user is located in. A remote MSS-BBU cluster 100-2 to 100-N may be regarded as a logical function per user and comprises BBUs 110 with remote user functions out to the cloud.

Each signal processing unit or BBU 110 also comprises or is coupled to a Radio Bearer Control function (RBC) 170 which plays an active role in the home MSS-BBU cluster 100-1 during a radio bearer setup procedure. The RBC 170 may also have a direct interface to the intra-RM 130. Even if the RBC 170 may exist in each BBU 110 of each MSS-BBU cluster 100-1 to 100-N, FIG. 1 does not show the RBCs 170 for the remote MSS-BBU clusters 100-2 to 100-N. Hence, each BBU 110 of a MSS-BBU cluster 100 comprises a radio bearer control entity operable to initialize a user-specific data processing dedicated to a user associated to the at least one RRH (or radio cell) coupled to said BBU.

Each MSS-BBU cluster 100-1 to 100-N may comprise a multitude of BBUs 110. Each BBU 110 may handle at least one RRH and may have an individual network identifier such as a MAC- or an IP-address, for example. The RRHs associated to the BBUs 110 may communicate with their respective associated BBU 110 via an optical interface, such as the CPRI, for example. The various BBUs 110 of one BBU cluster 100-1 to 100-N may be interconnected with each other via an internal high-speed intra-cluster bus (not explicitly shown in FIG. 1). The signal processing resource allocation to the individual BBUs 110 of a cluster 100 is managed by the intra-RM 130 which has an interface to the LRM 120 of each BBU 110, wherein the LRM 120 manages the processing resources within each BBU 110 and reports occupied and/or unoccupied processing resources, such as, for example, hardware accelerator modules, DSPs, FPGAs, or the like.

There is a network router entity 180 coupled to the intra-RM 130 in each MSS-BBU cluster 100-1 to 100-N. Thereby, the router entity 180 has the tasks to route S1 data to and from a BBU 110 allocated for user-specific signal processing either on intra- or on inter-MSS-BBU level via Ethernet protocol, for example. Further, the router entity 180 may route the user-specific data to and from the cell physical layer processing functions either on intra- or on inter-MSS-BBU level via Ethernet. Note that each BBU 110 of an MSS-BBU cluster 100 is assumed to have its own IP- and MAC-address on Ethernet.

The inter-RM 140 of a signal processing cluster 100 selects the signal processing resource clusters of the inter-MSS-BBU processing resource pool comprised by the clusters 100-1 to 100-N. For that purpose, the different inter-RMs 140 may communicate with each other via the inter-cluster interface 150, which may be an enhanced X2 (eX2) interface on Ethernet including a high-speed variant of the well-known X2 interface. A communication between the intra-RM 130 and the inter-RM 140 of the DCC 160 can, for example, take place via a common shared memory. Note that the DCC entity 160 of a MSS-BBU cluster 100-1, ... , 100-N may have its own Ethernet MAC address according to embodiments.

After having presented a cloud system overview in the previous sections with reference to FIG. 1, individual hierarchical entities of a home or remote MSS-BBU cluster 100-1, ... , 100-N will be described in more detail in the following.

The LRM 120, the intra-RM 130, and the inter-RM 140 each comprise one or more entities:
- an Information management Entity (IE), responsible for information gathering, monitoring, and reporting;
- a Decision making Entity (DE), wherein decision algorithms are implemented, and which possesses all entities that are necessary for making the decisions of a resource manager and for communicating with other units; and
- an Execution Entity (EE), which implements the decisions of the decision making entity.

Figure 2A:
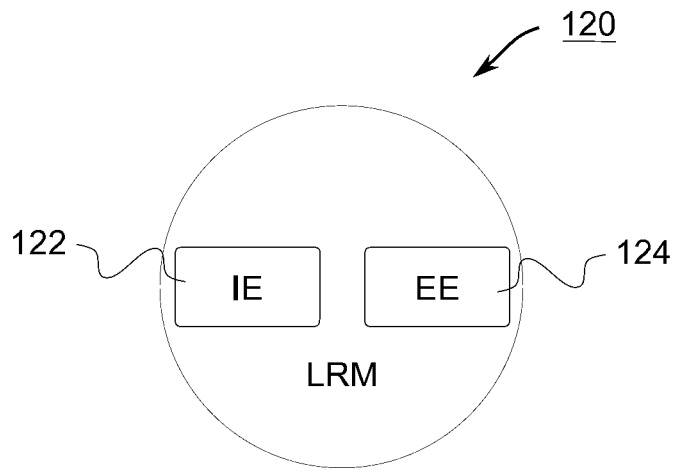
FIG. 2a illustrates a baseband processing unit specific processing resource management entity according to an embodiment.

Turning now to FIG. 2a, illustrating a unit-specific processing resource management entity (LRM) 120, the LRM 120 may comprise an Information management Entity (IE) 122 and an Execution Entity (EE) 124. The IE 122 may be operable to monitor a processing resource status of an associated BBU 110 and to provide information indicative of the monitored processing resource and/or load status to the intra-RM 130. In other words, the IE 122 may be operable or adapted to monitor/report used and/or unused signal processing capabilities of an associated BBU 110. The EE 124 may be operable or configured to allocate or assign signal processing resources of its associated BBU 110 in response to a (home or remote) signal processing request received or forwarded from the intra-RM 130. Thereby, the signal processing request may relate to user or bearer-specific signal processing of a user associated to a BBU 110 of the same (home) cluster or of a user associated to a BBU of a remote MSS-BBU cluster 100-2 to 100-N (remote signal processing request). In other words, the EE 124 may be regarded as being responsible for the execution of the imperatives of the associated intra-RM 130.

Figure 2B:
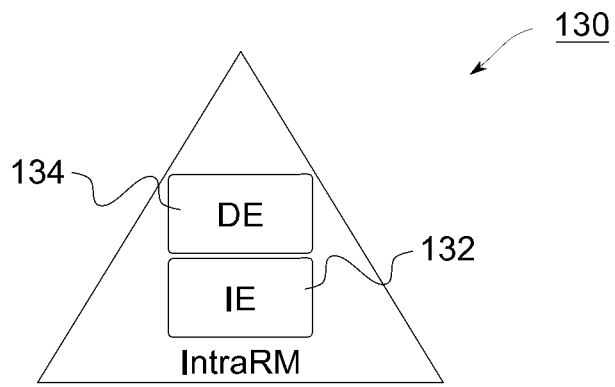
FIG. 2b illustrates an intra-cluster processing resource management entity according to an embodiment.

Turning now to FIG. 2b, the intra-RM 130 may be regarded as the main processing resource manager of a MSS-BBU cluster 100-1, ..., 100-N. It may manage the entire baseband signal processing resources of the MSS-BBU cluster comprising the plurality of baseband signal processing units or BBUs 110. The intra-RM 130 may comprise an Information management Entity (IE) 132 which may be operable to determine available baseband processing resources of its associated MSS-BBU cluster based on monitored and reported signal processing resource status information provided from the LRMs 120 of the plurality of BBUs 110 of the cluster. That is to say, the IE 132 of the intra-RM 130 may retrieve raw resource information from each LRM 120 and process a quantized resource state. Further, the intra-RM 130 may comprise a Decision Entity (DE) 134 which is operable to assign internally (=home) requested signal processing tasks or externally (=remotely) requested signal processing tasks to one or more of the BBUs 110 based on the unit-specific resource or load status information provided by the LRMs 120. In other words, the DE 134 of the intra-RM 130 may be responsible for the assignment of resource requests and may select appropriate BBUs 110 by comparing the resource requests or respective demanded processing resource capacities with the unit-specific load status information. If a resource allocation request exceeds the capacity of the associated MSS-BBU cluster 100-1, the DE 134 of the intra-RM 130 may decide to forward the request to the inter-RM 140 for initiating a remote allocation of processing resources on at least one of the remote MSS-BBU clusters 100-2 to 100-N. In other words, the inter-RM 130 may be operable to forward a signal processing request from a BBU 110 to the cluster's inter-RM 140 for initializing a remote baseband signal processing resource allocation within at least one remote processing cluster 100-2 to 100-N, if available processing resources of the own (home) cluster 100-1 are not sufficient for the processing request.

Figure 2C:
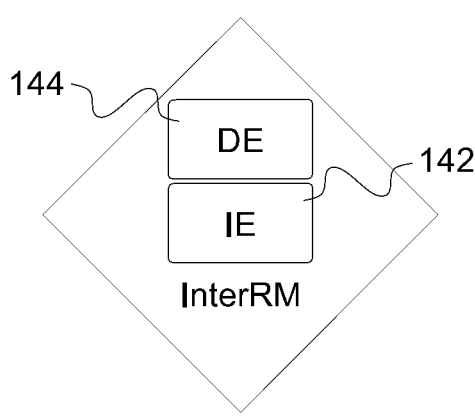
FIG. 2c illustrates an inter-cluster signal processing resource management entity according to an embodiment.

Turning now to FIG. 2c, a schematic block diagram of the inter-RM 140 is shown. The inter-RM 140 may be regarded as responsible for the allocation of processing resources among different processing clusters 100-1, ..., 100-N of the MSS-BBU cluster pool. For that purpose, the inter-cluster processing resource management entity or inter-RM 140 may comprise an Information management Entity (IE) 142 which is operable to access information on available processing resources as a resource state of its associated MSS-BBU cluster. Thereby, the information on the available processing resources may be provided by the intra-RM 130, for example, via a memory device which is shared between the intra-RM 130 and the inter-RM 140 (=shared memory). Further, the inter-RM 140 may comprise a Decision Entity (DE) 144 which is operable to determine, based on the information on the available signal processing resources, a remote MSS-BBU cluster 100-2, ..., 100-N having sufficient signal processing resources available according to a signal processing request from the own (home) associated MSS-BBU cluster 100-1, if available processing resources of the home MSS-BBU cluster 100-1 are not sufficient for said signal processing request. Whenever an inter-cluster resource allocation is triggered by the intra-RM 130, the DE 144 of the inter-RM 140 has to find appropriate signal processing resources for possessing the inter-resource allocation request remotely on another interconnected MSS-BBU cluster. It thus takes part in all necessary processing resource sharing mechanisms from resource reporting to determination of a target MSS-BBU cluster for transferring the signal processing process between two clusters. The IE 142 of the inter-RM 140 may retrieve raw resource information as a resource state from the shared memory between the intra-RM 130 and the inter-RM 140.

Figure 3:
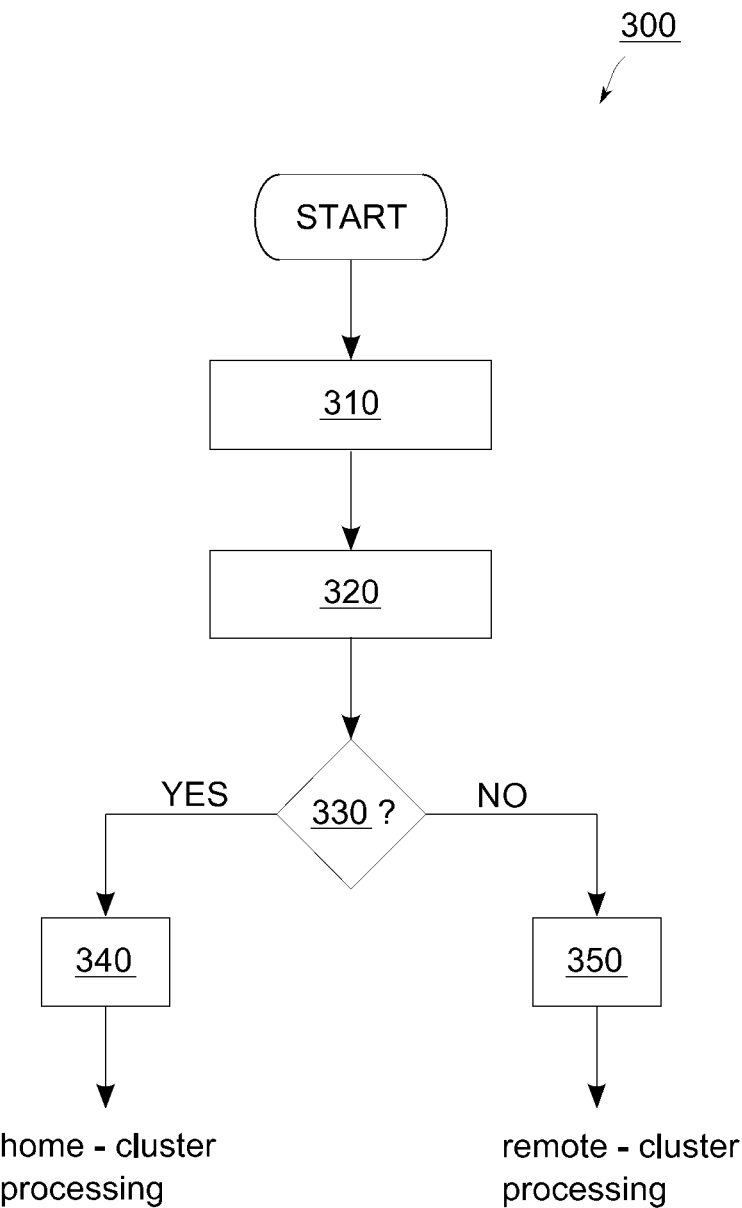
FIG. 3 shows a schematic flow-chart of a method, according to an embodiment.

Embodiments of the present invention also comprise a method for a baseband processing cluster 100-1, ..., 100-N of a wireless communication network, wherein the processing cluster comprises a plurality of baseband processing units or BBUs 110, wherein each of the BBUs 110 is coupled to at least one remote radio head of the wireless communication network. FIG. 3 shows a schematic flowchart of an embodiment of such a method 300.

The method 300 comprises a step 310 of providing information on an available signal processing capability among or of the plurality of BBUs 110 of the MSS-BBU cluster. As has been explained before, the provision of the information on the available signal processing capability of the MSS-BBU cluster may comprise a sub-step of monitoring individual signal processing resources of each BBU 110 of the MSS-BBU cluster, and a sub-step of reporting the monitored individual signal processing resources to the intra-RM 130 which is coupled to each of the BBUs 110 or the LRMs 120 thereof. Further providing 310 the information on the available signal processing capability is based on the reported individual signal processing resources. The method 300 may further comprise a step 320 of receiving a signal processing request (e.g. in response to a user-specific radio bearer request) for a user associated to a cell or a RRH coupled to a BBU 110 of the cluster 100-1. In a further step 330 of the method 300 it may be checked if the information on the available signal processing capability of the MSS-BBU cluster 100-1 indicates sufficient available signal processing resources for the received signal processing request. If this is the case, that is, if the information on the available signal processing capability of the cluster 100-1 indicates sufficient available signal processing resources, signal processing resources among the plurality of BBUs 110 of the cluster 100-1 may be allocated for processing the request (step 340). However, if the available signal processing capability within the cluster 100-1 indicates no sufficiently available signal processing resources for the baseband processing or radio bearer request, the method 300 comprises a step 350 of sending a remote processing resource request to at least one remote MSS-BBU cluster 100-2 to 100-N. In other words, while step 340 leads to an home-cluster baseband processing, wherein a baseband processing according to the request is performed by one or more BBUs 110 of the home cluster 100-1, step 350 leads to a (remote) processing of the request using resources of remote BBUs of a remote MSS-BBU cluster 100-2 to 100-N. Both branches of FIG. 3 will be now explained in more detail referring to the FIGS. 4 to 6.

In any case, the information management of method 300 may be divided into two parts. Step 310 denotes a preparation phase for processing a resource view for both intra-RM 130 and inter-RM 140. While step 340 denotes a subsequent intra-cluster processing resource allocation, step 350 denotes a remote, inter-cluster processing resource allocation. The processing pool management deals with user functions either from the S1 termination up to the PHY user part (user-related baseband processing) or a part of it. The cell and control functions (cell physical processor) may be located at the home BBU 110, where the RRH with the cell of interest is connected to. In the following, only the error-free case with ACKnowledge (ACK) will be described without loss of generality.

Figure 4:
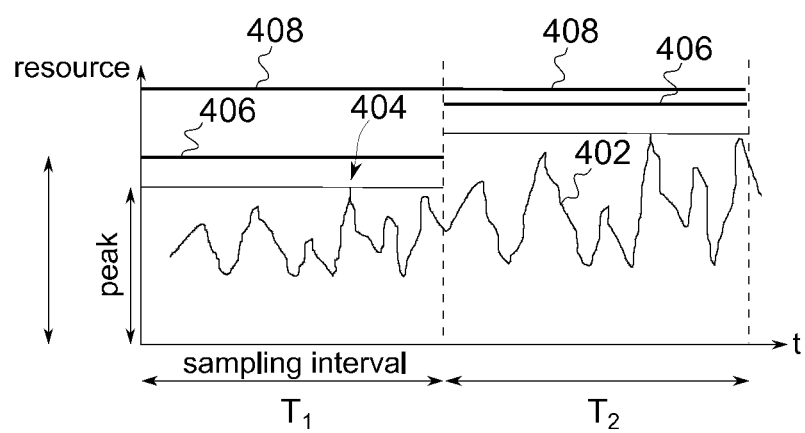
FIG. 4 illustrates a variation of available signal processing resources within a cluster over time.
Figure 5:
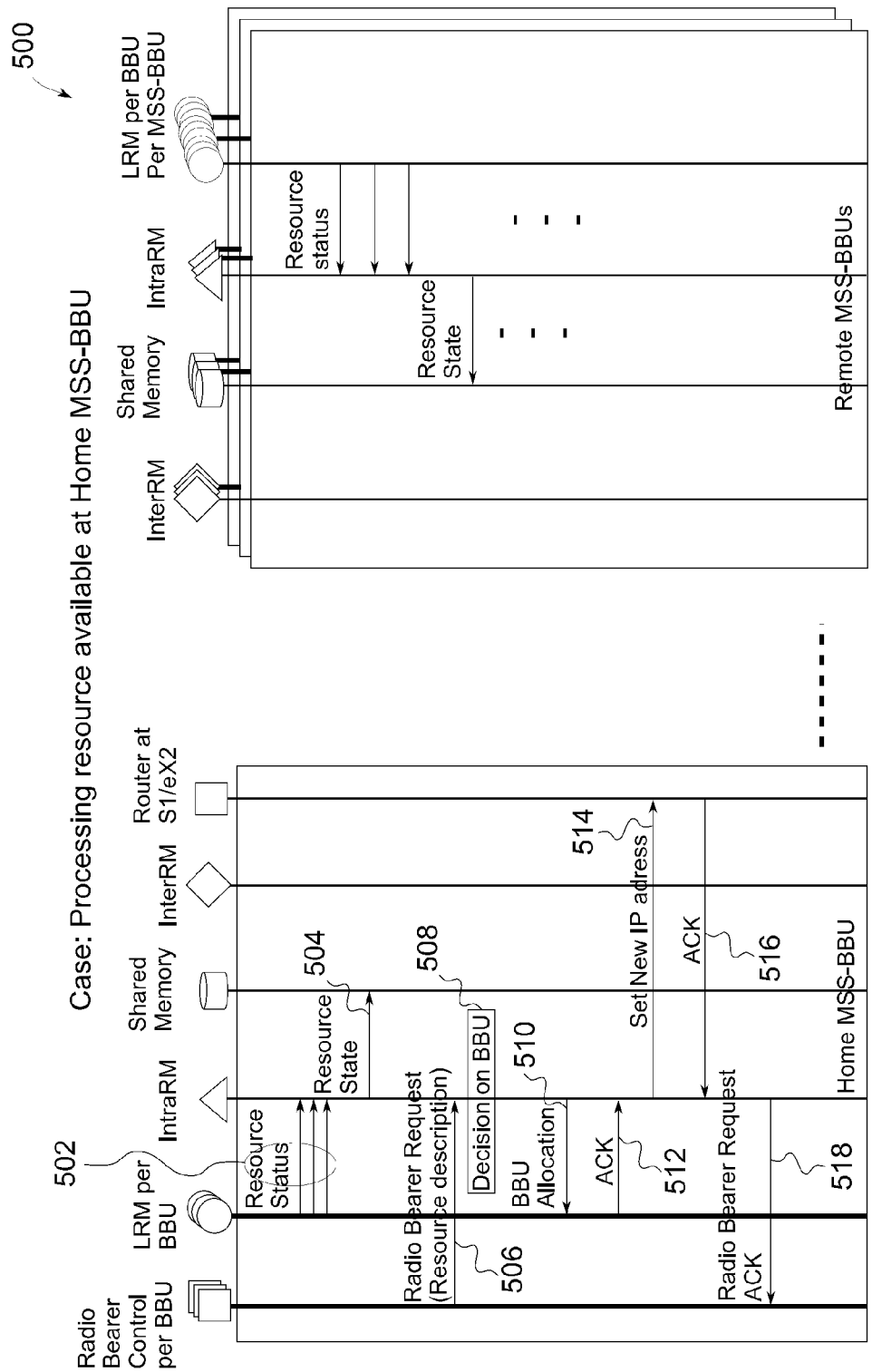
FIG. 5 illustrates a Message Sequence Chart (MSC) for a first embodiment.

As can be seen from the exemplary message sequence chart (MSC) from FIG. 5, illustrating a scenario for a high performance resource information exchange in a hierarchical control plane under the real time constraints of the distributed RAN, during the preparation phase the LRMs 120 associated to each BBU 110 of the home MSS-BBU cluster 100-1 may continuously monitor the resource status of the BBUs 110 and report it, for example, in case of significant changes, directly to the associated (home) intra-RM 130, see reference numeral 502. By means of the monitored resource status of the individual BBUs 110 in step 502, the intra-RM 130 may retrieve the resource status of all LRMs 120 and process a resource state (see 504) which may e.g. include the resource status from the BBU 110 with the largest available processing resource. The intra-RM 130 may detect a maximum capacity among the BBUs 110 of the home MSS-BBU cluster 100-1 and then build an envelope of the maximum value on the basis of past experiences (e.g. variances of the maximum value) to the shared memory. With this respect FIG. 4 depicts a variation 402 of used processing resources of an individual BBU 110 of the processing cluster 100. In a first time interval $T_1$ a maximum processing load 404 of a BBU in the cluster 100 is detected. Based on this maximum 404 the intra-RM 130 may derive an envelope 406 as a margin based on variances of the past maximum value and/or additional processing capabilities of the other BBUs 110 of the cluster. The same thing may be done for a subsequent time interval $T_2$. The envelope 406 may be set in relation to the maximum available processing resources 408 of the BBU in order to determine free or still available processing resources of the BBU.

Having the processing resource state of the home MSS-BBU cluster 100-1 in the shared memory, the inter-RM 140 of each MSS-BBU 100-1 to 100-N may retrieve said resource state from the shared memory in case of a signal processing resource request or demand arriving from the inter-RM 140 of another, remote MSS-BBU cluster 100-2, ..., 100-N. The home inter-RM 140 may hence exchange the cluster-specific resource state information on demand with its peer inter-RMs 140 of remote MSS-BBU clusters 100-2, ..., 100-N.

If inside a BBU 110 of the home MSS-BBU cluster 100-1 a radio bearer request (together with a capacity description derived from Quality of Service parameters) arrives at the LRM 120 from the originating RBC 170 associated to the BBU 110 (step 506), the infra-RM 130 may decide on the BBU allocation for this request within the home MSS-BBU cluster 100-1, for example based on a filling algorithm (see steps 508, 510). After an acknowledgement (ACK) by the LRM 120 in step 512 the intra-RM 130 may send an IP address of the allocated BBU 110 to the router entity 180 of the home MSS-BBU cluster 100-1 (see step 514). After an acknowledgement 516 of the router entity 180 the intra-RM 130 may send an acknowledgement to the originating RBC 170 and the requested radio bearer may be set up. Hence, the intra-RM 130 may be operable to provide a network address, e.g. comprising an IP address, of an allocated or assigned BBU 110 having sufficient available signal processing capabilities for performing a user-specific signal processing dedicated to a user of radio cell associated to the MSS-BBU cluster 100-1 of the router 180. In this way, data may be routed from the originating BBU 110 to which the cell of the user is associated to another baseband processing unit 110 of the home cluster MSS-BBU 100-1.

Figure 6:
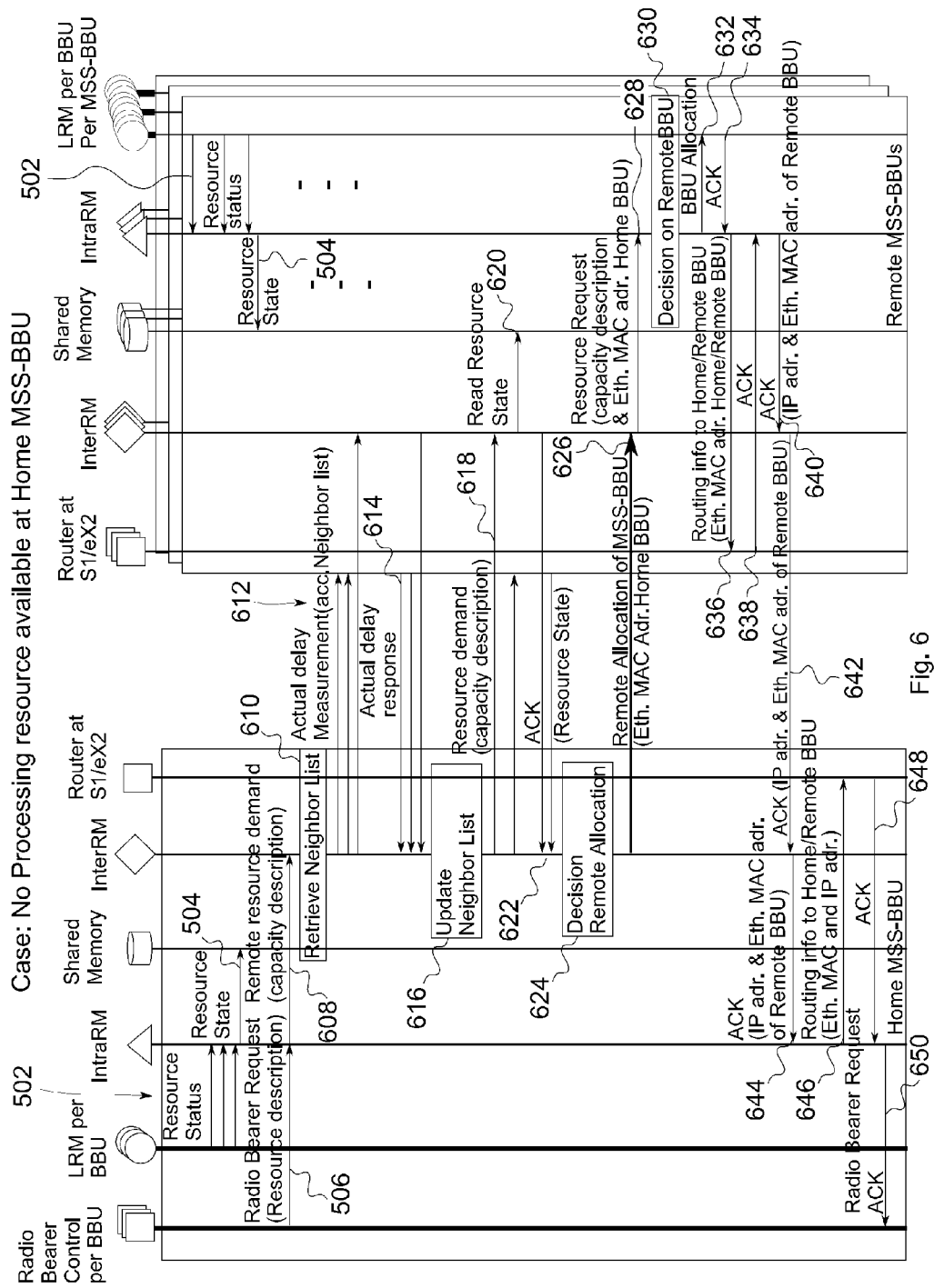
FIG. 6 shows a MSC for a second embodiment.

Turning now to FIG. 6, another scenario for a high performance resource information exchange in a hierarchical control plane under the real time constraints of the distributed RAN will be described. In case of FIG. 6, no further processing resources are available inside the home MSS-BBU cluster 100-1. Again, the information management may be divided into two parts, that is, a preparation phase 310 for processing a resource view for the intra-RM 130 and the inter-RM 140 inside each MSS-BBU cluster and the inter-cluster processing resource allocation of step 350. The remote processing pool management deals here with user functions either form the S1 termination up to their PHY user part (user-related baseband processing) or a part of it. The cell and control functions are located at the home MSS-BBU cluster 100-1, where the RRH coupled to the radio cell of interest, is connected. For didactic reasons only an error-free case is described.

During the preparation phase 310 the same procedure is running as has been described with reference to FIG. 5 and steps 502, 504 depicted therein. After having provided the information on available signal processing capabilities among the plurality of BBUs 110 of the home MSS-BBU cluster 100-1, a radio bearer request of a user associated to a cell coupled to a BBU 110 of the home MSS-BBU cluster 100-1 may be initiated in step 506 together with a capacity description derived from the quality of service parameters. Hence, if inside a home BBU 110 a radio bearer request with a capacity description arrives at the BBU's LRM 120 from the BBU's RBC 170 and if available processing resources of the home MSS-BBU cluster 100-1 are not sufficient to meet a corresponding processing resource request, the intra-RM 130 of the home MSS-BBU cluster 100-1 may forward the resource request or demand to its associated inter-RM 140 in step 608 for a remote resource allocation meeting the capacity description. That is to say, the intra-RM 130 may be operable to forward a baseband processing request from an associated home BBU 110 to the inter-RM 140 for initializing a remote signal processing resource allocation within at least one remote MSS-BBU cluster 100-2, ..., 100-N, if available processing resources of the home MSS-BBU cluster 100-1 are not sufficient for the received signal processing request from the associated home BBU 110.

In response to the forwarded signal processing request of step 608 the home inter-RM 140 may retrieve or access a list of neighboring, i.e. remote, MSS-BBU clusters 100-2 to 100-N in step 610. Then, the inter-RM 140 of the home MSS-BBU 100-1 may trigger an actual delay measurement to the MSS-BBU clusters of its neighbor list as a result of a delay initialization procedure in step 612. That is to say, the inter-RM 140 may be operable to initiate a time delay measurement for determining a signal propagation delay between its associated home MSS-BBU cluster 100-1 and at least one remote MSS-BBU cluster 100-2 to 100-N. In response to the delay measurement of step 612 the inter-RM 140 of the home MSS-BBU cluster 100-1 may receive actual delay responses in a step 614 from one or more remote MSS-BBU clusters 100-2 to 100-N. After the responses by potential remote MSS-BBU clusters 100-2 to 100-N, the inter-RM 140 of the home MSS-BBU cluster 100-1 may update its neighbor list in step 616 after a new comparison with an allowed maximum time delay at the eX2 interface 150 meeting required latency requirements. In other words, the inter-cluster processing resource management entity 140 may be operable, in response to the time delay measurement of step 612, to update a list of suitable remote MSS-BBU clusters 100-2, ..., 100-N leading to a signal propagation delay for a remote signal processing below a maximum allowed time delay in step 616.

After having updated a neighbor list in step 616 the home inter-RM 140 may forward a "Resource demand" message including a capacity description from its associated intra-RM 130 to all remote inter-RMs of the potential remote MSS-BBU clusters according to the updated neighbor list (see reference numeral 618). Hence, the inter-RM 140 may be operable to forward a signal processing request from its associated (home) MSS-BBU cluster 100-1 to all remote inter-cluster processing resource management entities 140 of the potential remote MSS-BBU clusters 100-2, . . . , 100-N of the updated neighbor list.

Each remote inter-RM 140 which receives such a "Resource demand" message of step 618 may now read the resource state from the shared memory with its respective associated intra-RM 130, see step 620. If the read resource state, for example, related to the remote BBU 110 having the highest free signal processing capacity of the remote MSS-BBU cluster 100-2, . . . , 100-N, meets the processing capacity requested by the home inter-RM 140, the potential remote MSS-BBU cluster 100-2, . . . , 100-N (i.e. the remote inter-RM 140) may answer with an acknowledgement (ACK) possibly including the resource status in step 622. If the resource state acquired in step 620 does however not meet the requirement, the remote inter-RM 140 may answer with an NACK instead. After having received the acknowledgement of step 622 the home inter-RM 140 may take a decision on the remote processing allocation in step 624. For this decision there may be two options: Either the home inter-RM 140 may decide for the remote MSS-BBU cluster which first answered with an acknowledgement message in step 622, or the home inter-RM 140 may wait for the responses of all remote inter-RMs of potential remote MSS-BBU clusters including their respective resource state according to the actual neighbor list. It may then select, among the potential remote processing clusters who answered with an acknowledgement message in step 622, the one remote MSS-BBU cluster 100-2, . . . , 100-N with the largest processing margin indicated in its resource state. That means, according to one embodiment, the inter-RM 140 of the home processing cluster may be operable to select the remote MSS-BBU cluster 100-2, . . . , 100-N for remote signal processing related to a radio bearer request 506 of a user associated to the home cluster, which indicates the largest available remote signal processing capability. According to another embodiment, the inter-RM 140 of the home processing cluster 100-1 may also be operable to select a remote MSS-BBU cluster 100-2, . . . , 100-N for remote signal processing related to the radio bearer request 506, which has been the first remote MSS-BBU cluster to acknowledge the related remote signal processing resource request 618 from the home inter-RM 140.

After the decision of step 624 the inter-RM 140 of the home processing cluster 100-1 may send a "Remote Allocation of MSS-BBU" message 626, which may e.g. include the Ethernet MAC address of the home BBU 110 dedicated the user to which the original radio bearer request 506 relates. Further, the "Remote Allocation of MSS-BBU" message 626 may comprise a user ID of said user. That is to say, the inter-RM 140 of the home processing cluster 100-1 may be operable to forward a network address (Ethernet MAC address and/or IP address) of a BBU 110 belonging to the home cluster and an identifier of a user associated to the radio cell corresponding to said BBU 110 to a selected remote processing cluster 100-2, . . . , 100-N for a remote signal processing of radio bearer data associated to said user.

The inter-RM 140 of the remote MSS-BBU cluster may now transmit a "Resource Request" message to its associated (remote) intra-RM 130 in step 628, wherein the "Resource Request" message may include a capacity description which may have already been received with the "Resource demand" message 618, the Ethernet MAC address of the home BBU and the corresponding user ID.

Seen from the perspective of the remote inter-RM 140 it may hence be operable to forward a signal processing resource request received from a remote (i.e. the home) cluster to its associated intra-RM 130 to initialize an allocation of at least one BBU 110 of the MSS-BBU cluster 100-2, . . . , 100-N having sufficient available signal processing capabilities for performing user-specific signal processing related to a user associated to a remote signal processing unit (i.e. a home BBU) of the remote signal processing cluster (i.e. the home cluster 100-1), wherein the signal processing resource request comprises a network address of said remote BBU 110 (i.e. a home BBU) and an identifier of said user.

The remote intra-RM 130 of the selected remote MSS-BBU cluster 100-2, . . . , 100-N may now decide on a remote BBU 110 to process the job according to its filling algorithm, thereby taking into account the information on available signal processing capabilities among the plurality of remote processing units 110 of the remote MSS-BBU cluster 100-2, . . . , 100-N, see step 630. Seen from the perspective of the remote intra-RM 130 it may hence be operable to receive a signal processing request from its associated intra-RM 140 in order to initialize an allocation of one or more associated BBUs 110 (i.e. the remote BBUs) having sufficient available signal processing capabilities for performing user-specific signal processing for a user associated to a remote BBU 110 (i.e. a home BBU) of a remote processing cluster (i.e. the home processing cluster) 100-1.

After the decision on a (remote) BBU 110 the (remote) intra-RM 130 may send a "BBU Allocation" message to the LRM 120 of the selected (remote) BBU 110, see reference numeral 632. Then, after receiving an ACK from this LRM 120 in step 634, the (remote) intra-RM 130 may send a "Routing info to Home/Remote BBU" message 636 to the router 180 of the remote MSS-BBU cluster 100-2, . . . , 100-N at S1/eX2 interfaces. This message may include the Ethernet MAC address of the home (i.e. originating) and the remote BBU as well as the corresponding (originating) user ID. Hence, seen from the perspective of the remote intra-RM 130 it may be operable to provide a network address of an allocated or assigned baseband processing unit 110 having sufficient available processing capabilities for performing user-specific signal processing for a user associated to a remote BBU (i.e. the originating home BBU), a network address of said remote BBU, and an identifier of said (originating) user to a network router and/or the inter-RM 140 of its associated MSS-BBU cluster 100-2, . . . , 100-N. After an ACK of the router 180 in step 638 the intra-RM 130 of the remote MSS-BBU cluster 100-2, . . . , 100-N may send an ACK message to its associated (remote) inter-RM 140 in step 640. This ACK message 640 may include the IP address and the Ethernet MAC address of the (remote) processing unit 110 of the remote processing cluster.

The inter-RM 140 of the remote MSS-BBU cluster 100-2, . . . , 100-N may then forward this ACK message 640 to the inter-RM 140 of the home MSS-BBU cluster 100-1 including the complete routing information to the remote BBU in the selected remote MSS-BBU cluster 100-2, . . . , 100-N. Hence, again, the remote inter-RM 140 may be operable to forward a network address of a remote BBU to the home MSS-BBU cluster 100-1. If seen from the perspective of the remote inter-RM 140 it may be operable to forward a network address of an associated BBU to a remote MSS-BBU cluster 100-1.

With the reception of this ACK message 642 by the inter-RM 140 of the home MSS-BBU cluster 100-1, the remote allocation procedure may be regarded as closed. The inter-RM 140 of the home MSS-BBU cluster 100-1 may now forward this received ACK message to its associated (home) intra-RM 130 including the complete routing information to the remote BBU, see step 644. The intra-RM 130 of the home MSS-BBU cluster 100-1 may then send the "Routing info to Home/Remote BBU" message to its associated router entity 180 at S1/eX2-interface, which may include the following information elements: IP address of remote BBU, Ethernet MAC address of remote BBU, Ethernet MAC address of home BBU, and user ID. Hence, the intra-RM 130 may be operable to provide a network address of an assigned remote BBU having sufficient available signal processing capabilities, a network address of said remote BBU, and an identifier of the user to a network router 180 and/or the inter-RM 140 of the MSS-BBU cluster 100-1. After receiving an ACK message from the router 180, see reference numeral 648, the intra-RM 130 of the home processing cluster 100-1 may send a radio bearer request ACK message to the originating RBC module 170 comprised by the home BBU 110, wherein the cell and control functions are allocated. This may terminate the radio bearer request procedure depicted in FIG. 6.

Note that the actual delay measurements to each remote MSS-BBU cluster with minimum one active remotely allocated radio bearer processing may be repeated from time to time. The measurement period may be a function of a delay variance and an available margin to an allowed maximum delay at the extended X2 interface 150 measured during initialization or after a handover of a user within one MSS-BBU cell cluster. In case of a handover of a user to a cell within the same MSS-BBU cell cluster, the allowed delay at the extended X2 interface might change if a user moves to a cell belonging to a RRH closer or further away from the MSS-BBU cluster. In this case a new potential neighbor list may be processed and applied by the inter-RM 140 of the home MSS-BBU cluster 100-1.

To summarize, embodiments of the present invention relate to cloud RAN environments comprising several cooperating multi-site, multi-standard baseband units (MSS-BBUs) that manage the baseband processing for different clusters of remote radio heads in a pool, wherein each RRH cluster is connected to a MSS-BBU cluster. Each MSS-BBU cluster comprises a number of baseband processing units (BBUs). The MSS-BBU clusters may further be connected together to achieve a higher flexibility in resource pooling and in the capability to shift baseband processing from low traffic areas to high traffic areas. It is proposed a novel architecture to cope with the entire resource management of a mobile cloud that comprises resources on two levels of abstraction, that is, intra-MSS-BBU cluster and inter-MSS-BBU cluster resource pooling. One purpose for such pooling concepts is to benefit from statistical multiplexing gains (CAPEX reduction) resulting from heterogeneous low profiles over time within the cell clusters. In addition, the BBU sites will be significantly reduced compared to conventional deployments (OPEX reduction). This may all be applied to a multi-standard context, as for example, LTE/UMTS (HSPA).

Embodiments relate to the control plane architecture for a mobile cloud based on a hierarchical resource management system. A mobile cloud comprises a multitude of resources at two abstraction levels. Therefore, the management of resources of the entire network may be regarded as a major challenge. In embodiments, the processing resource management is divided into an intra-cluster part and an inter-cluster part. These parts are managed separately by different resource management units. In addition, embodiments treat the communication scenarios of all the resource management units included on the intra-cluster and the inter-cluster level.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A first baseband signal processing cluster for use in a wireless communication network that uses a baseband cloud computing architecture, the first baseband signal processing cluster comprising:
 a plurality of baseband signal processing units configured to interface with a first plurality of radio heads that serve a first radio cell cluster of a wireless communication network, the plurality of baseband signal processing units including a corresponding plurality of at least one unit-specific processing resource management entity configured to manage a first processing resource allocation within the corresponding baseband signal processing unit;
 an intra-cluster processing resource management entity coupled to the plurality of at least one unit-specific processing resource management entity and configured to manage a second processing resource allocation among the plurality of baseband signal processing units; and
 a first inter-cluster processing resource management entity coupled to the intra-cluster processing resource management entity and configured to exchange information with a second inter-cluster processing resource management entity of a second baseband signal processing cluster to cooperate with the second inter-cluster processing resource management entity for management of a third processing resource allocation among the first and second baseband signal processing clusters, the second baseband signal processing cluster configured to interface with a second plurality of radio heads that serve a second radio cell cluster of the wireless communication network, the second radio cell cluster being different from the first radio cell cluster;
 wherein the first inter-cluster processing resource management entity is configured to access information on available processing resources of the first baseband signal processing cluster in response to a received user-specific baseband signal processing request from the second baseband signal processing cluster and configured to acknowledge the received user-specific baseband signal processing request in case of sufficient available processing resources and, otherwise, to reject the received user-specific baseband signal processing request.

2. The first baseband signal processing cluster according to claim 1, wherein the intra-cluster processing resource management entity comprises:
 an information management entity configured to determine available baseband signal processing resources of the first baseband signal processing cluster based on unit-specific load status information provided from the at least one unit-specific processing resource management entities of the plurality of baseband signal processing units; and
 a decision entity configured to assign a user-specific baseband signal processing task to one or more baseband signal processing units of the first baseband signal processing cluster based on a comparison of the unit-specific load status information with a required processing resource capacity for the user-specific baseband signal processing task.

3. The first baseband signal processing cluster according to claim 1, wherein the intra-cluster processing resource management entity is configured to forward a user-specific baseband signal processing request from at least one baseband signal processing unit of the plurality of baseband signal processing units to the first inter-cluster processing resource management entity if available processing resources of the first baseband signal processing cluster are not sufficient for the user-specific specific baseband signal processing request to initialize a specific third processing resource allocation among the first and second baseband signal processing clusters.

4. The first baseband signal processing cluster according to claim 1, wherein the intra-cluster processing resource management entity is configured to receive a user-specific specific baseband signal processing request via the first inter-cluster processing resource management entity to initialize a specific second processing resource allocation of one or more baseband signal processing units having sufficient available processing capabilities for performing user-specific baseband signal processing for a user associated with a remote baseband signal processing unit of the second baseband signal processing cluster.

5. The first baseband signal processing cluster according to claim 1, wherein the intra-cluster processing resource management entity is configured to provide a network address of an allocated baseband signal processing unit having sufficient available processing capabilities for performing user-specific baseband signal processing for a user associated with a remote baseband signal processing unit of the second baseband signal processing cluster, a network address of said remote baseband signal processing unit, and an identifier of said user to a network router and/or the first inter-cluster processing resource management entity of the first baseband signal processing cluster.

6. The first baseband signal processing cluster according to claim 1, wherein the first inter-cluster processing resource management entity comprises:
 an information management entity configured to access information on available processing resources of the first baseband signal processing cluster, the information comprising information on which baseband signal processing unit of the plurality of baseband signal processing units has a maximum available processing capacity the first baseband signal processing cluster; and
 a decision entity configured to find another baseband signal processing cluster having sufficient processing resources available to handle a user-specific baseband signal processing request from the first baseband signal processing cluster if available processing resources of the first baseband signal processing cluster are not sufficient for said user-specific baseband signal processing request.

7. The first baseband signal processing cluster according to claim 1, wherein the first inter-cluster processing resource management entity is configured to forward a received user-specific baseband signal processing request from the second baseband signal processing cluster together with an associated processing capacity description derived from quality of service parameters of an original radio bearer request to a remote intra-cluster processing resource management entity of the second baseband signal processing cluster.

8. The first baseband signal processing cluster according to claim 1, wherein the first inter-cluster processing resource management entity is configured to initiate time delay measurements for determining signal propagation delays between the first baseband signal processing cluster and other baseband signal processing clusters, including the second baseband signal processing cluster.

9. The first baseband signal processing cluster according to claim 8, wherein the first inter-cluster processing resource management entity is configured, in response to the time delay measurements, to update a neighbor list of suitable other baseband signal processing clusters as possible neighbors with determined signal propagation delays below a maximum allowed time delay.

10. The first baseband signal processing cluster according to claim 9, wherein the first inter-cluster processing resource management entity is configured to forward a user-specific baseband signal processing request from the first baseband signal processing cluster to remote inter-cluster processing resource management entities of the other baseband signal processing clusters of the updated neighbor list.

11. The first baseband signal processing cluster according to claim 1, wherein the first inter-cluster processing resource management entity is configured to select a remote baseband signal processing cluster for remote processing related to a radio bearer request from other baseband signal processing clusters, including the second baseband signal processing cluster, the remote baseband signal processing cluster being selected after being the first to acknowledge a forwarded processing resource request from the first inter-cluster processing resource management entity or being selected because an available processing capability indicated by the remote baseband signal processing cluster was a largest available processing capability among the other baseband signal processing clusters responding to the forwarded processing resource request.

12. The first baseband signal processing cluster according to claim 1, wherein the first inter-cluster processing resource management entity is configured to forward a network address of an initial baseband signal processing unit associated with a remote radio head through which a user initiated a radio bearer request and an identifier of the user to the second baseband signal processing cluster for remote processing of radio bearer data associated with said radio bearer request.

13. The first baseband signal processing cluster according to claim 1, wherein the first inter-cluster processing resource management entity is configured to forward a user-specific baseband signal processing request received from the second baseband signal processing cluster to the intra-cluster processing resource management entity to initialize an allocation of at least one baseband signal processing unit of the plurality of signal processing units to handle the user-specific baseband signal processing request, the allocated at least one baseband signal processing unit having sufficient available processing capabilities for performing user-specific baseband signal processing for a user associated with a remote baseband signal processing unit of the second baseband signal processing cluster, wherein the user-specific baseband signal processing request comprises a network address of said remote baseband signal processing unit and an identifier of said user.

14. A method for processing resource allocation in a first baseband signal processing cluster of a wireless communication network that uses a baseband cloud computing architecture, the method comprising:
monitoring resource status of a plurality of baseband signal processing units at a corresponding plurality of at least one unit-specific processing resource management entity in conjunction with managing a first processing resource allocation at the at least one unit-specific processing resource management entity for the corresponding baseband signal processing unit, the plurality of baseband signal processing units associated with a first baseband signal processing cluster and configured to interface with a first plurality of radio heads that serve a first radio cell cluster of a wireless communication network;
providing information on an available signal processing capability of the plurality of baseband signal processing units from the plurality of at least one unit-specific processing resource management entity to an intra-cluster processing resource management entity of the first baseband signal processing cluster;
managing a second signal processing resource allocation at the intra-cluster processing resource management entity by allocating signal processing resources among the plurality of baseband signal processing units in response to a user-specific processing request from a user served by a specific radio head of the first plurality of radio heads if the information on the available signal processing capability of the plurality of baseband signal processing units indicates a specific baseband signal processing unit of the plurality of baseband signal processing units that interfaces with the specific radio head does not have sufficient available processing resources for processing the user-specific processing request and at least one other baseband signal processing unit of the plurality of baseband signal processing units has sufficient available processing resources to process the user-specific processing request;
forwarding the user-specific processing request from the intra-cluster processing resource management entity to a first inter-cluster processing resource management entity of the first baseband signal processing cluster if the information on the available signal processing capability of the plurality of baseband signal processing units indicates the plurality of baseband signal processing units do not have sufficient available processing resources for processing the user-specific processing request;
sending a remote processing resource request from the first inter-cluster processing resource management entity to a second baseband signal processing cluster, in response to receiving the user-specific processing request from the intra-cluster processing resource management entity, to cooperate with a second inter-cluster processing resource management entity of the second baseband signal processing cluster for management of a third processing resource allocation among the first and second baseband processing clusters, the second baseband signal processing cluster configured to interface with a second plurality of radio heads that serve a second radio cell cluster of the wireless communication network, the second radio cell cluster being different from the first radio cell cluster;

in response to a received user-specific baseband signal processing request from the second baseband signal processing cluster, accessing information on available processing resources of the first baseband signal processing cluster; and acknowledging the received user-specific baseband signal processing request in case of sufficient available processing resources and, otherwise, rejecting the received user-specific baseband signal processing request.

15. The method according to claim 14, further comprising:

accessing information on available processing resources of the first baseband signal processing cluster, the information including information on which baseband signal processing unit of the plurality of baseband signal processing units has a maximum available processing capacity the first baseband signal processing cluster; and finding another baseband signal processing cluster having sufficient processing resources available to handle a user-specific baseband signal processing request from the first baseband signal processing cluster if available processing resources of the first baseband signal processing cluster are not sufficient for said user-specific baseband signal processing request.

16. The method according to claim 14, further comprising:

initiating time delay measurements for determining signal propagation delays between the first baseband signal processing cluster and other baseband signal processing clusters, including the second baseband signal processing cluster.

17. The method according to claim 14, further comprising:

forwarding a network address of an initial baseband signal processing unit associated with a remote radio head through which a user initiated a radio bearer request and an identifier of the user to the second baseband signal processing cluster for remote processing of radio bearer data associated with said radio bearer request.

18. The method according to claim 14, further comprising:

forwarding a received user-specific baseband signal processing request from the second baseband signal processing cluster together with an associated processing capacity description derived from quality of service parameters of an original radio bearer request to a remote intra-cluster processing resource management entity of the second baseband signal processing cluster.

19. The method according to claim 14, further comprising:

selecting a remote baseband signal processing cluster for remote processing related to a radio bearer request from other baseband signal processing clusters, including the second baseband signal processing cluster, the remote baseband signal processing cluster being selected after being the first to acknowledge a forwarded processing resource request from the first inter-cluster processing resource management entity or being selected because an available processing capability indicated by the remote baseband signal processing cluster was a largest available processing capability among the other remote baseband signal processing clusters responding to the forwarded processing resource request.

20. A non-transitory computer-readable medium storing program instructions that, when executed by a computer, cause a computer-controlled device to perform a method for processing resource allocation in a first baseband signal processing cluster of a wireless communication network that uses a baseband cloud computing architecture, the method comprising:

monitoring resource status of a plurality of baseband signal processing units at a corresponding plurality of at least one unit-specific processing resource management entity in conjunction with managing a first processing resource allocation at the at least one unit-specific processing resource management entity for the corresponding baseband signal processing unit, the plurality of baseband signal processing units associated with a first baseband signal processing cluster and configured to interface with a first plurality of radio heads that serve a first radio cell cluster of a wireless communication network;

providing information on an available signal processing capability of the plurality of baseband signal processing units from the plurality of at least one unit-specific processing resource management entity to an intra-cluster processing resource management entity of the first baseband signal processing cluster;

managing a second signal processing resource allocation at the intra-cluster processing resource management entity by allocating signal processing resources among the plurality of baseband signal processing units in response to a user-specific processing request from a user served by a specific radio head of the first plurality of radio heads if the information on the available signal processing capability of the plurality of baseband signal processing units indicates a specific baseband signal processing unit of the plurality of baseband signal processing units that interfaces with the specific radio head does not have sufficient available processing resources for processing the user-specific processing request and at least one other baseband signal processing unit of the plurality of baseband signal processing units has sufficient available processing resources to process the user-specific processing request;

forwarding the user-specific processing request from the intra-cluster processing resource management entity to a first inter-cluster processing resource management entity of the first baseband signal processing cluster if the information on the available signal processing capability of the plurality of baseband signal processing units indicates the plurality of baseband signal processing units do not have sufficient available processing resources for processing the user-specific processing request;

sending a remote processing resource request from the first inter-cluster processing resource management entity to a second baseband signal processing cluster, in response to receiving the user-specific processing request from the intra-cluster processing resource management entity, to cooperate with a second inter-cluster processing resource management entity of the second baseband signal processing cluster for management of a third processing resource allocation among the first and second baseband processing clusters, the second baseband signal processing cluster configured to interface with a second plurality of radio heads that serve a second radio cell cluster of the wireless communication network, the second radio cell cluster being different from the first radio dell cluster;

in response to a received user-specific baseband signal processing request from the second baseband signal processing cluster, accessing information on available processing resources of the first baseband signal processing cluster; and acknowledging the received user-specific baseband signal processing request in case of sufficient available processing resources and, otherwise, rejecting the received user-specific baseband signal processing request.

\* \* \* \* \*